(12) United States Patent
Sakae et al.

(10) Patent No.: US 12,118,476 B2
(45) Date of Patent: Oct. 15, 2024

(54) ANOMALY DETECTION DEVICE

(71) Applicant: NEC CORPORATION, Tokyo (JP)

(72) Inventors: Yoshiaki Sakae, Tokyo (JP); Kazuhiko Isoyama, Tokyo (JP); Takayoshi Asakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1120 days.

(21) Appl. No.: 16/963,873

(22) PCT Filed: Dec. 20, 2018

(86) PCT No.: PCT/JP2018/047057
§ 371 (c)(1),
(2) Date: Jul. 22, 2020

(87) PCT Pub. No.: WO2019/142591
PCT Pub. Date: Jul. 25, 2019

(65) Prior Publication Data
US 2021/0049477 A1   Feb. 18, 2021

(30) Foreign Application Priority Data
Jan. 22, 2018   (JP) .................. 2018-007840

(51) Int. Cl.
*G06N 5/025*   (2023.01)
*G06F 9/54*   (2006.01)
*G06F 11/30*   (2006.01)

(52) U.S. Cl.
CPC ............. *G06N 5/025* (2013.01); *G06F 9/542* (2013.01); *G06F 9/544* (2013.01); *G06F 11/3051* (2013.01)

(58) Field of Classification Search
CPC ..................................................... G06N 5/025
See application file for complete search history.

(56) References Cited

U.S. PATENT DOCUMENTS

| | | | |
|---|---|---|---|
| 10,673,880 B1* | 6/2020 | Pratt | H04L 63/1425 |
| 2016/0029966 A1* | 2/2016 | Salas-Boni | A61B 5/02055 |
| | | | 600/347 |
| 2017/0214702 A1* | 7/2017 | Moscovici | H04W 12/106 |

(Continued)

FOREIGN PATENT DOCUMENTS

| | | |
|---|---|---|
| JP | 2009-075817 A | 4/2009 |
| JP | 2009-076103 A | 4/2009 |

(Continued)

OTHER PUBLICATIONS

Yin J, Yang Q, Pan JJ. Sensor-based abnormal human-activity detection. IEEE transactions on knowledge and data engineering. Jun. 27, 2008;20(8):1082-90. (Year: 2008).*

(Continued)

*Primary Examiner* — Oluwatosin Alabi
(74) *Attorney, Agent, or Firm* — Sughrue Mion, PLLC

(57) ABSTRACT

Based on a normal model, it is detected whether or not an event signal of a computer system is anomalous. In parallel with the normal-model-based anomaly detection, it is detected based on a rule whether or not the event signal is anomalous. Then, a final anomaly detection result is generated by performing comprehensive determination based on detection results of the normal-model-based anomaly detection and the rule-based anomaly detection.

9 Claims, 8 Drawing Sheets

(56) References Cited

U.S. PATENT DOCUMENTS

2018/0219889 A1\* 8/2018 Oliner .................... G06N 3/04
2018/0357556 A1\* 12/2018 Rai ........................ G06N 20/00
2019/0079506 A1\* 3/2019 Hubauer ............ G05B 23/0208

FOREIGN PATENT DOCUMENTS

| JP | 5331774 B2 | 10/2013 |
| JP | 2017-068748 A | 4/2017 |
| JP | 2017-072882 A | 4/2017 |

OTHER PUBLICATIONS

International Search Report for PCT/JP2018/047057, dated Apr. 2, 2019.

\* cited by examiner

FIG. 3

|    | v1 | v2 | v3 | .... |
|----|----|----|----|------|
| R1 | 0  | 0  | 1  | .... |
| R2 | 0  | 0  | 0  | .... |
| R3 | 0  | 0  | 1  | .... |
| ⋮  | ⋮  | ⋮  | ⋮  | ⋮    |
| RN | 0  | 0  | 0  | .... |

FIG. 4

| No | DATE AND TIME | ANOMALOUS EVENT SIGNAL | SCORE (NORMAL MODEL) | APPLYING RULE | SCORE (RULE BASED) |
|---|---|---|---|---|---|
| 1 | 2018/01/05 16:11:45 | V3 | 0.9 | R1,R3 | 0.8 |
| 2 | 2018/01/05 16:30:30 | V33 | 0.6 | NONE | NONE |
| ... | ... | ... | ... | ... | ... |

ID DEVICE

CROSS REFERENCE TO RELATED APPLICATIONS

This application is a National Stage of International Application No. PCT/JP2018/047057 filed Dec. 20, 2018, claiming priority based on Japanese Patent Application No. 2018-007840 filed Jan. 22, 2018, the disclosure of which is incorporated herein in its entirety by reference.

TECHNICAL FIELD

The present invention relates to an anomaly detection device, an anomaly detection method, and a recording medium.

BACKGROUND ART

When various kinds of equipment or systems cause anomaly, it is important to detect the anomaly quickly. Various anomaly detection methods for that purpose have been proposed. Typical methods are an anomaly detection method based on normal model and an anomaly detection method based on rule.

In an anomaly detection method based on normal model, the normal state of a system is learned and stored as a normal model. The normal state of a system may be the usual state of the system. The normal model is also called a usual model. In a case where a state obtained from the system after the normal model is stored deviates from the normal model, the state is determined to be anomalous.

On the other hand, in an anomaly detection method based on rule, a rule that defines a condition for detecting anomalies is created and stored. It is determined using the stored rule whether or not a state obtained from a system is anomalous.

The above two anomaly detection methods each have an advantage and a disadvantage. The anomaly detection method based on normal model is based on an idea that a correct state is unchanged. Therefore, not only a known anomaly but also an unknown anomaly can be detected. However, the grounds for anomaly determination is that a state is a statistically deviating one. Therefore, it is impossible to explain what kind of phenomenon is occurring. On the other hand, the anomaly detection method based on rule facilitates understanding of the grounds for anomaly determination. However, it is difficult to previously define a rule that detects an unknown anomaly. Even for a known anomaly, it is difficult to define an appropriate rule in which reliable detection and false detection of anomalies are balanced. Therefore, when false negative is prevented, the tendency for over-detection increases. Meanwhile, when over-detection is prevented, false negative is likely to increase.

Then, an anomaly detection method in which the anomaly detection method based on normal model and the anomaly detection method based on rule are combined has been proposed as an anomaly detection method related to the present invention (for example, Patent Document 1).

In the anomaly detection method related to the present invention, first, statistical anomaly detection based on normal model is performed by offline processing. Then, a rule used for rule-based anomaly detection is generated using the result obtained by the anomaly detection. Next, anomaly detection is actually performed using the above rule by online processing. Consequently, it is possible to detect an anomaly with high sensitivity, and it is possible to not only detect but also explain the anomaly.

Patent Document 1: Japanese Patent No. 5331774

As mentioned above, the anomaly detection method in which the normal-model-based anomaly detection method and the rule-based anomaly detection method are combined has been proposed as the anomaly detection method related to the present invention. Meanwhile, the anomaly detection method related to the present invention is premised on that an anomaly detected by the normal-model-based anomaly detection method can be detected by the rule-based anomaly detection method. However, there is no guarantee that a rule for detecting all anomalies detected based on normal model without fail can be always created. If a necessary rule cannot be created, the accuracy of detection decreases in the anomaly detection method related to the present invention. The reason is that in the anomaly detection method related to the present invention, actual anomaly detection is performed only by the rule-based anomaly detection method.

SUMMARY

An object of the present invention is to provide an anomaly detection device which solves the abovementioned problem.

An anomaly detection device according to an aspect of the present invention includes: a normal-model-based anomaly detecting unit configured to detect based on a normal model whether or not an event signal of a computer system is anomalous; a rule-based anomaly detecting unit configured to operate in parallel with the normal-model-based anomaly detecting unit, and detect based on a rule whether or not the event signal is anomalous; and an anomaly detection integrating unit configured to generate a final anomaly detection result by performing comprehensive determination based on detection results from the normal-model-based anomaly detecting unit and the rule-based anomaly detecting unit.

Further, an anomaly detection method according to another aspect of the present invention includes: detecting based on a normal model whether or not an event signal of a computer system is anomalous; in parallel with the detecting based on the normal model whether or not anomalous, detecting based on a rule whether or not the event signal is anomalous; and generating a final anomaly detection result by performing comprehensive determination based on detection results of the detecting based on the normal model whether or not anomalous and the detecting based on the rule whether or not anomalous.

Further, on a computer-readable recording medium according to another aspect of the present invention a computer-readable recording medium, a program is recorded. The program includes instructions for causing a computer to functions as: a normal-model-based anomaly detecting unit configured to detect based on a normal model whether or not an event signal of a computer system is anomalous; a rule-based anomaly detecting unit configured to operate in parallel with the normal-model-based anomaly detecting unit, and detect based on a rule whether or not the event signal is anomalous; and an anomaly detection integrating unit configured to generate a final anomaly detection result by performing comprehensive determination based on detection results from the normal-model-based anomaly detecting unit and the rule-based anomaly detecting unit.

With the abovementioned configurations, the present invention can increase the accuracy of detection. The reason is that a final anomaly detection result is generated by performing normal-model-based anomaly detection and rule-based anomaly detection in parallel and comprehensively determining based on the results of both the detections.

BRIEF DESCRIPTION OF DRAWINGS

FIG. 3 is a view showing a table showing an example of a validity degree in the first example embodiment of the present invention;

FIG. 4 is a view showing an example of display of an anomaly detection result in the first example embodiment of the present invention;

EXEMPLARY EMBODIMENTS

Next, example embodiments of the present invention will be described in detail with reference to the drawings.

First Example Embodiment

Figure 1:
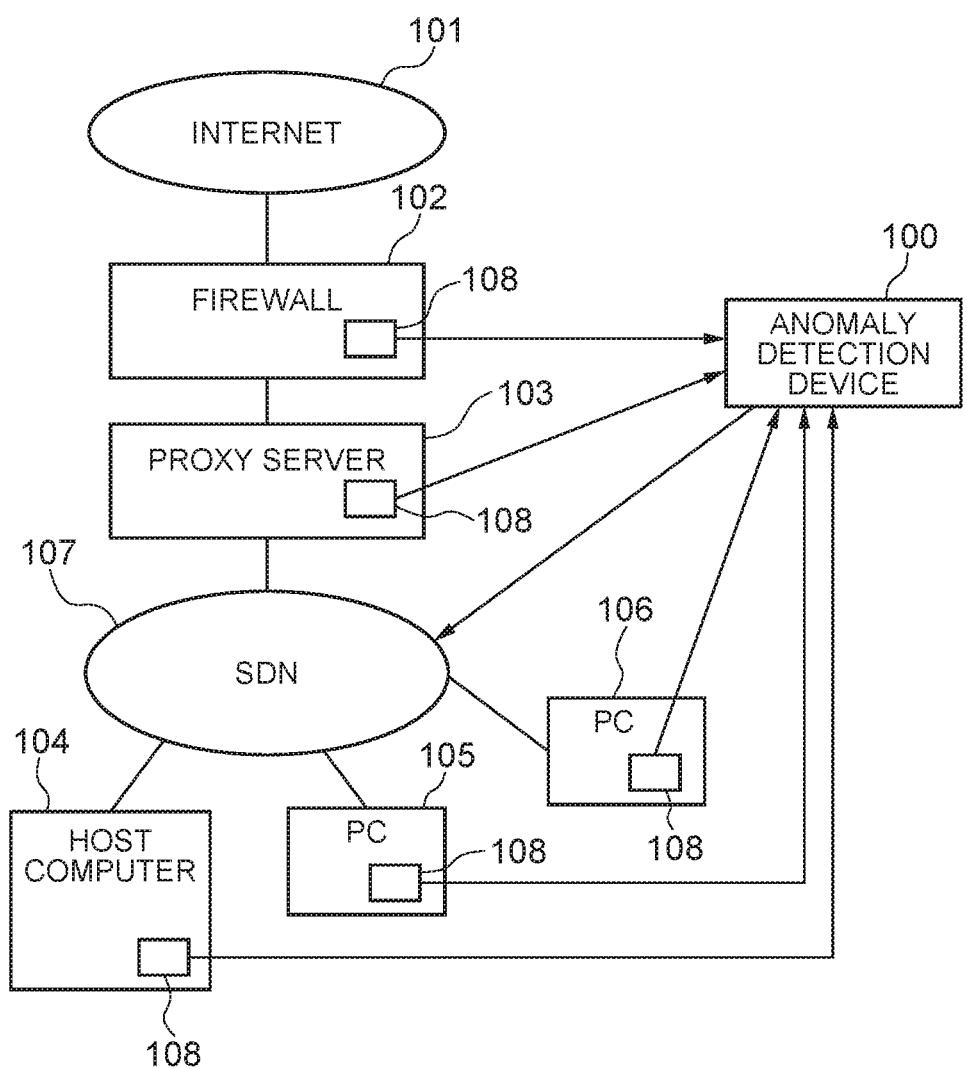
FIG. 1 is a hardware configuration diagram showing an example of a computer system to which an anomaly detection device according to a first example embodiment of the present invention is applied.

FIG. 1 is a hardware configuration diagram showing an example of a computer system to which an anomaly detection device 100 according to a first example embodiment of the present invention is applied. The computer system of this example includes the anomaly detection device 100, a firewall 102 connected to the Internet 101, a proxy server 103 connected to the firewall 102, a host computer 104, a plurality of PCs (personal computers) 105, 106, and an SDN (Software-Defined Networking) 107 that connects the proxy server 103, the host computer 104, and the PCs 105, 105 to each other The anomaly detection device 100 is configured to collect event signals from the respective parts of the computer system. An event signal includes the occurrence time of an event related to an activity of a resource of the computer system and the content of the activity. A resource is, for example, a computer, a program, a process, and a file. An activity of a resource is, for example, start of a process, reading/writing of a file, inter-process communication, and access to the network.

Further, the anomaly detection device 100 is configured to detect the presence/absence of anomaly based on the collected event signals. The anomaly detection device 100 is configured to execute two anomaly detection methods, a normal-model-based anomaly detection method and a rule-based anomaly detection method, in parallel and detect an anomalous event signal caused in the computer system.

Further, the anomaly detection device 100 is configured to present the detected anomaly to the administrator of the computer system. The anomaly detection device 100 is also configured to automatically take necessary measures to minimize damage caused by the detected anomaly.

Below, the anomaly detection device 100 will be described in detail.

Figure 2:
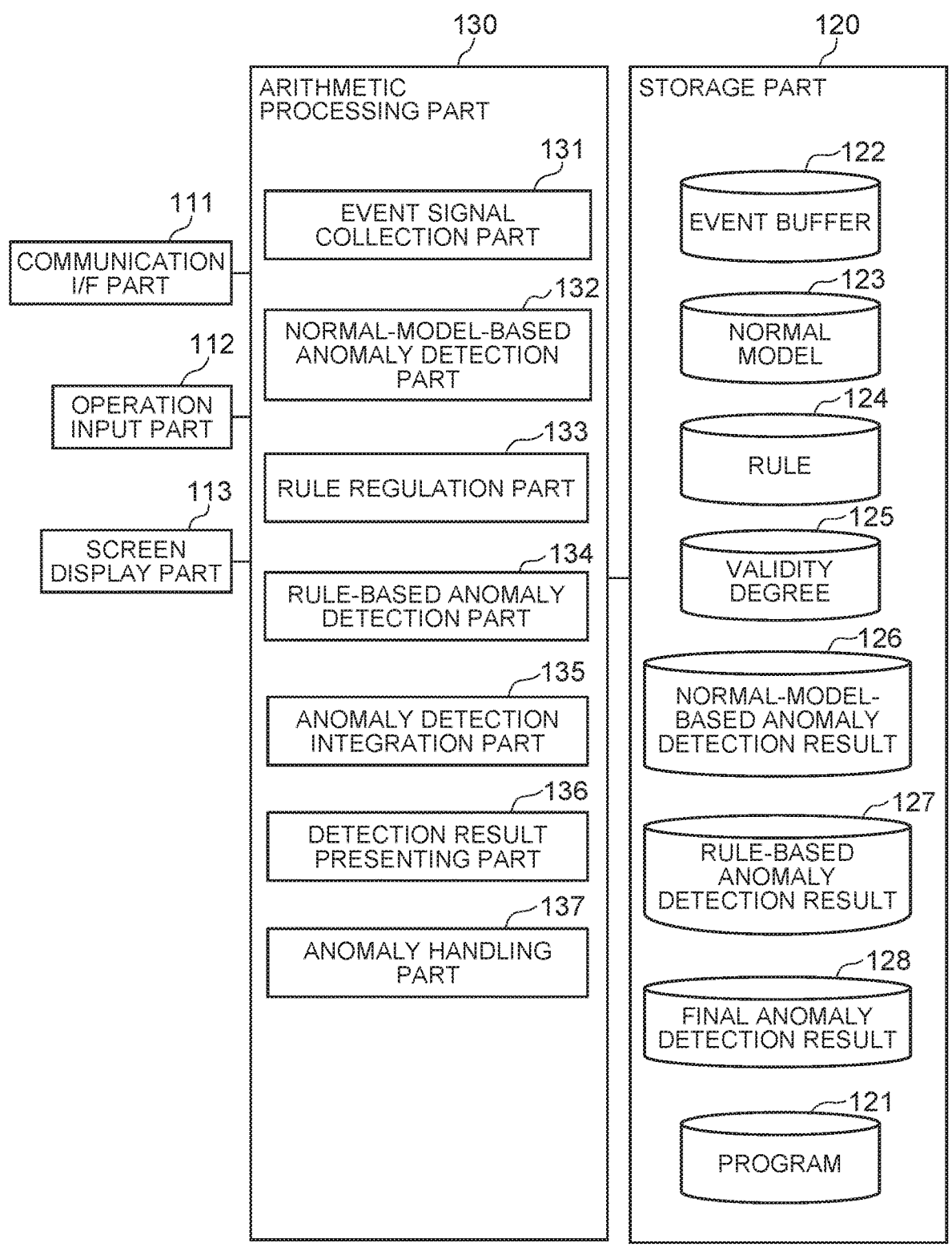
FIG. 2 is a block diagram showing an example of the anomaly detection device according to the first example embodiment of the present invention.

FIG. 2 is a block diagram showing an example of the anomaly detection device 100. Referring to FIG. 2, the anomaly detection device 100 includes a communication interface (I/F) part 111, an operation input part 112, a screen display part 113, a storage part 120, and an arithmetic processing part 130.

The communication interface part 111 includes a dedicated data communication circuit, and is configured to perform data communication with various devices such as a computer connected via a wireless or wired communication line.

The operation input part 112 includes an operation input device such as a keyboard and a mouse, and is configured to detect an operation by an operator and output to the arithmetic processing part 130.

The screen display part 113 includes a screen display device such as an LCD (Liquid Crystal Display) or a PDP (Plasma Display Panel), and is configured to display various kinds of information such as an anomaly detection result on a screen.

The storage part 120 includes a storage device such as a hard disk or a memory, and is configured to store processing information necessary for various types of processing executed by the arithmetic processing part 130 and store a program 121. The program 121 is a program that realizes various processing parts by being loaded and executed by the arithmetic processing part 130. The program 121 is loaded in advance from an external device or a computer-readable recording medium via a data input/output function such as the communication interface part 111 and stored into the storage part 120.

Main processing information stored in the storage part 120 includes an event buffer 122, a normal model 123, a rule 124, a validity degree 125, a normal-model-based anomaly detection result 126, a rule-based anomaly detection result 127, and a final anomaly detection result 128.

The event buffer 122 is configured to accumulate a predefined number of event signals of the computer system that is the target of anomaly detection or accumulate the event signals for a predefined period. The event buffer 122 may be a FIFO (First In First Out) register having a predetermined capacity.

The normal model 123 is a model of the normal state (the usual state) of the computer system. The normal model 123 is used in a normal-model-based anomaly detection method. One or more normal models 123 are included.

The rule 124 is a rule for identifying an anomalous event signal. In general, there are a plurality of rules 124. The rule 124 is used in a rule-based anomaly detection method. As mentioned before, an event signal is related to an activity of a resource of the computer system. Therefore, in the rule 124, a threshold value, a condition or the like for identifying an anomalous resource activity is defined. For example, in a case where data or physical quantity related to an activity of a resource included in an event signal meets a threshold value, condition or the like defined in a certain rule, the event signal is considered to be anomalous. The rule 124 is present for each resource. Alternatively, the rule 124 is present for each type of an activity of a resource. For example, there is a rule to detect an anomalous activity of the host computer 104 of FIG. 1. Moreover, there is a rule to detect an anomalous activity of the PCs 105, 106. Thus, the rule is related to a specific resource. To each rule, rule identification information for distinguishing it from the other rule is assigned. Moreover, to each rule, a score to be assigned to an event signal detected as anomalous by the rule is assigned.

The validity degree 125 represents the degree of validity of the rule 124. The validity degree 125 is present for each rule, that is, for each rule identification information. In this example embodiment, the validity degree 125 takes either value 0 or value 1. The initial value of the validity degree 125 is value 0. The validity degree of value 0 represents completely invalid. The validity degree of value 1 represents completely valid. However, in another example embodiment, the validity degree 125 may take not only the above two values but also an intermediate value thereof. Moreover, a score to be assigned to an event signal detected as anomalous by a certain rule may be calculated as a value obtained by multiplying a score assigned to the rule by the validity degree of the rule. The value of the validity degree 125 is dynamically changed in accordance with the result of anomaly determination based on normal model as will be described later.

Figure 3:
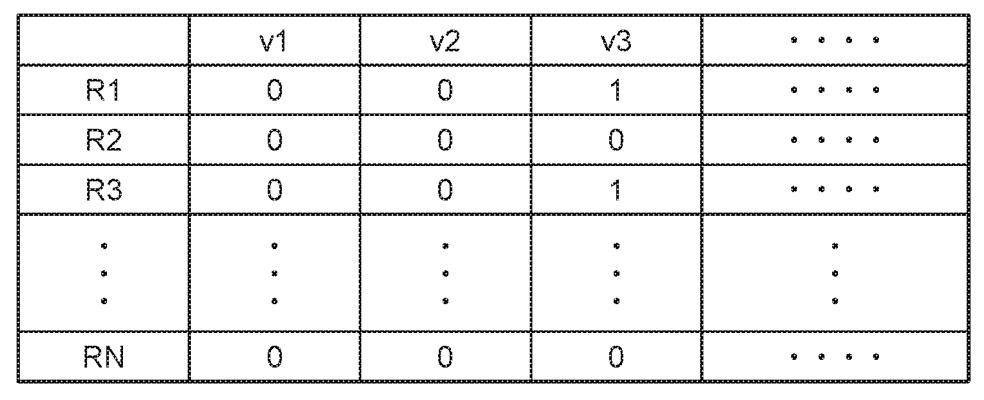

FIG. 3 is a table showing an example of the validity degree 125. Each row shows each rule. In this example, N rules R1 to RN are present. Each column shows an event signal that is the target of anomaly determination. In this example, the presence/absence of anomaly is determined in the order of event signal V1, event signal V2, event signal V3, . . . Value 0 or value 1 written in the intersection of the row and the column is a validity degree. For example, in the two columns corresponding to event signals V1 and V2 in FIG. 3, the validity degrees of all the rules R1 to RN are value 0. On the other hand, in the column corresponding to event signal V3, the two validity degrees corresponding to the rules R1 and R3 are value 1, and the validity degrees corresponding to the other rules are value 0.

The normal-model-based anomaly detection result 126 represents a result detected by the normal-model-based anomaly detection method. The anomaly detection result 126 includes an event signal detected as anomalous and a score indicating the degree of certainty of the anomaly detection. The value range of the score is 0 to 1, with the worst value being 0 and the best value being 1. However, the value range of the score is not limited to this.

The rule-based anomaly detection result 127 represents a result detected by the rule-based anomaly detection method. The rule-based anomaly detection result 127 includes an event signal detected as anomalous, a score indicating the degree of certainty of the anomaly detection, and a rule used in the anomaly detection. The value range of the score is 0 to 1, with the worst value being 0 and the best value being 1. However, the value range of the score is not limited to this.

The final anomaly detection result 128 represents a final anomaly detection result generated by performing comprehensive determination based on normal-model-based anomaly detection result 126 and the rule-based anomaly detection result 127.

The arithmetic processing part 130 includes a processor such as a microprocessor and its peripheral circuits. The arithmetic processing part 130 is configured to, by retrieving the program 121 from the storage part 120 and executing the program 121, cause the hardware and the program 121 to cooperate with each other and realize various processing parts. The processing parts realized by the arithmetic processing part 130 includes an event signal collection part 131, a normal-model-based anomaly detection part 132, a rule regulation part 133, a rule-based anomaly detection part 134, an anomaly detection integration part 135, a detection result presenting part 136, and an anomaly handling part 137.

The event signal collection part 131 is configured to collect event signals of the computer system. For example, in the computer system of FIG. 1, the firewall 102, the proxy server 103, the host computer 104, and the PCs 105, 106 are equipped with agents 108. The agent 108 is software that monitors events such as start of a process, reading/writing of a file, inter-process communication, and access to the network. The event signal collection part 131 receives event signals monitored by the agents 108 to collect the event signals of the computer system. The event signal collection part 131 is configured to copy the collected event signals and output to the event buffer 122 and the normal-model-based anomaly detection part 132, respectively.

The normal-model-based anomaly detection part 132 is configured to perform machine learning with event signals received from the event signal collection part 131 and the time sequence of the event signals as a usual state (a normal state) and create the normal model 123. The normal model 123 may be a single model, or may be a plurality of models obtained by machine learning from different viewpoints. The normal-model-based anomaly detection part 132 is also configured to perform actual anomaly detection after storing the normal model 123 in the storage part 120. That is to say, the normal-model-based anomaly detection part 132 collates an event signal received from the event signal collection part 131 with the normal model 123, and generates a detection result including a score whose value becomes larger as the degree of difference from the usual state becomes higher and the event signal. In a case where a plurality of normal models 123 are present, the normal-model-based anomaly detection part 132 may assign scores to the respective normal models and normalize the scores by some standard to calculate a final score. The normal-model-based anomaly detection part 132 outputs the generated detection result to the rule regulation part 133, and also stores the detection result as the normal-model-based anomaly detection result 126 into the storage part 120.

The rule regulation part 133 is configured to determine the validity degree of a rule based on a detection result received from the normal-model-based anomaly detection part 132. The rule regulation part 133 is also configured to store the determined validity degree into the validity degree 125 stored in the storage part 120. In more detail, the rule regulation part 133 is configured to execute the following processing for each received detection result.

First, the rule regulation part 133 extracts an event signal and a score from the detection result. Next, the rule regulation part 133 adds a new column corresponding to the extracted event signal to the table of the validity degree 125 described in FIG. 3. Next, the rule regelation part 133 determines whether or not the extracted score is equal to or more than a preset threshold value. In a case where the score is less than the threshold value, the rule regulation part 133 sets the validity degree of a rule in each row of the added column to value 0. In a case where the score is equal to or more than the threshold value, the rule regulation part 133 identifies a resource related to the extracted event signal. As mentioned above, an event signal is related to an activity of a resource of the computer system and therefore it is related to some resource. Next, the rule regulation part 133 sets, of the validity degrees of rules in the respective rows of the added column, the validity degree of a rule related to the identified resource to value 1, and sets the validity degree of a rule not related to the identified resource to value 0. Then, the rule regulation part 133 ends the processing on the detection result.

The rule-based anomaly detection part 134 is configured to retrieve event signals from the event buffer 122 in the time order and detect anomaly of the event signal based on rule 124. Thus, an event signal is input late into the rule-based anomaly detection part 134 via the event buffer 122. Therefore, with respect to the same event signal, the rule-based anomaly detection part 134 starts detection of the presence/absence of anomaly later than the normal-model-based anomaly detection part 132 in terms of time.

The rule-based anomaly detection part 134 detects the presence/absence of anomaly of an input event signal by collating the input event signal with the rule 124. To the event signal detected as anomalous, a score assigned to an applying rule is assigned. A rule used for actual collation is a rule with the validity degree 125 of value 1 written in a column corresponding to the above input event signal in the validity degree table shown in FIG. 3. A rule with the validity degree 125 of value 0 is not used for collation. In a case where a plurality of rules apply to the same event signal, the rule-based anomaly detection part 134 calculates a final score by adding the scores assigned to the respective rules in accordance with some standard. The rule-based anomaly detection part 134 stores the generated rule-based anomaly detection result 127 into the storage part 120.

The anomaly detection integration part 135 is configured to generate the final anomaly detection result 128 by retrieving the normal-model-based anomaly detection result 126 and the rule-based anomaly detection result 127 from the storage part 120 and performing comprehensive determination based on the anomaly detection results. In more detail, the anomaly detection integration part 135 is configured to execute the following processing.

The anomaly detection integration part 135 detects, of anomaly detection results included in the normal-model-based anomaly detection result 126, an event signal included in an anomaly detection result in which a score is equal to or more than a preset threshold value, as an anomalous event signal. Next, the anomaly detection integration part 135 compares the normal-model-based anomaly detection result 126 with the rule-based anomaly detection result 127, and thereby checks whether or not the event signal detected as anomalous based on normal model is detected as anomalous based on rule. Then, the anomaly detection integration part 135 classifies event signals detected as anomalous based on normal model into a first group detected as anomalous based on rule and a second group not detected as anomalous based on rule, and generates the final anomaly detection result 128 for each group. The first group includes an event signal detected as anomalous based on normal model, the score of the event signal, a rule used in detecting as anomalous based on rule, and the score of the rule. The second group includes an event signal detected as anomalous based on normal model, and the score of the event signal. The anomaly detection integration part 135 stores the final anomaly detection result 128 into the storage part 120.

The detection result presenting part 136 is configured to retrieve the final anomaly detection result 128 from the storage part 120, display an anomaly detection result on the screen display part 113 based on the retrieved final anomaly detection result 128, or/and transmit the anomaly detection result to a terminal or the like which is not shown in the drawings through the communication interface part 111.

FIG. 4 shows an example of an anomaly detection result displayed on the screen display part 113. In this example, one anomaly detection result is displayed in text in one row. Each row includes fields of serial number, date and time, event signal determined to be anomalous, normal-model-based anomaly detection score, applying rule, and rule-based anomaly detection score. For example, an anomaly detection result of No. 1 represents that date and time of detection is 16:11:45 on Jan. 5, 2018, anomalous event signal is V3, normal-model-based anomaly detection score is 0.9, applying rule is R1, R3, and rule-based anomaly detection score is 0.8. An anomaly detection result of No. 2 represents that date and time of detection is 16:30:30 on Jan. 5, 2018, anomalous event signal is V33, normal-model-based anomaly detection score is 0.6, and there is no applying rule in the rule-based anomaly detection method.

The anomaly handling part 137 is configured to retrieve the final anomaly detection result 128 from the storage part 120 and, based on the retrieved final anomaly detection result, automatically handle a detected anomaly. For example, the anomaly handling part 137 disconnects a computer in which an anomaly is detected from the network. Alternatively, the anomaly handling part 137 changes the settings of a firewall function (for example, Windows firewall) operating on each computer. Alternatively, the anomaly handling part 137 blocks communication from a computer in which an anomaly is detected by the SDN. Alternatively, the anomaly handling part 137 changes the routing table of each computer or controls the SDN to isolate a computer in which an anomaly is detected into a quarantine network. Alternatively, the anomaly handling part 137 disconnects a process in which an anomaly is detected from a computer on which the process is operating. Alternatively, the anomaly handling part 137 changes the settings of the firewall or controls the SDN so as not to allow communication from a process in which an anomaly is detected. Alternatively, the anomaly handling part 137 forcibly terminates a process in which an anomaly is detected. Alternatively, the anomaly handling part 137, after taking the abovementioned measures, puts a program file related to a process in which an anomaly is detected into quarantine or/and copies the program to the administration server side for analysis.

Next, an operation of the anomaly detection device 100 will be described.

Figure 5:
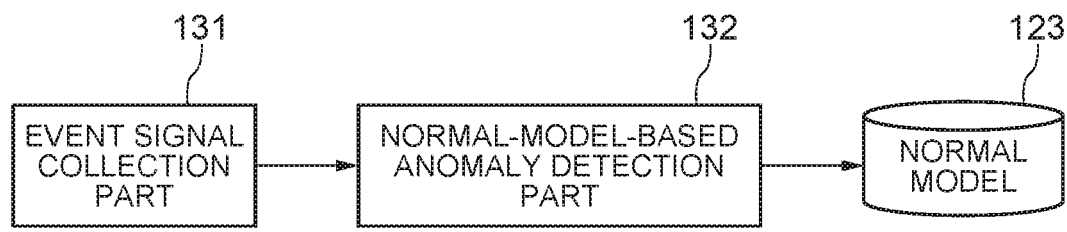
FIG. 5 is a view showing an example of the operation of creating a normal model in the anomaly detection device according to the first example embodiment of the present invention.

FIG. 5 shows an example of an operation of creating the normal model 123 by the anomaly detection device 100. Referring to FIG. 5, first, the event signal collection part 131 collects event signals from the agents 108 located in the respective parts of the computer system. Next, the normal-model-based anomaly detection part 132 performs machine learning with the time sequence of the collected event signals as a usual state (a normal state), and creates the normal model 123. A method for creating the normal model may be any method. For example, the projection distance method (PDM), the local sub-space classifier (LSC), or the like, can be used. Considering the usual state may change due to change of user, change of business, change of used software, and so on, learning may be continued at all times.

Figure 6:
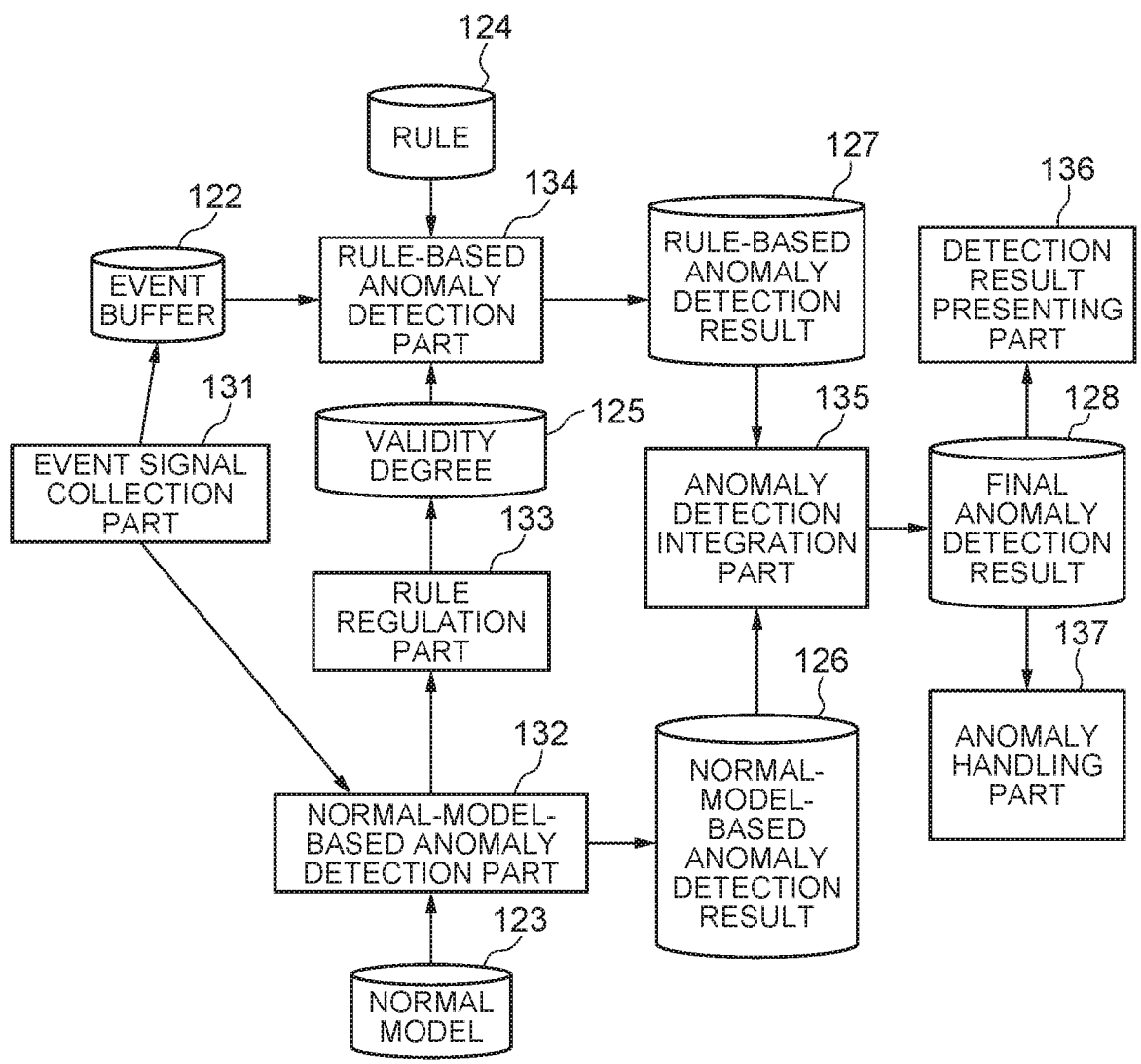
FIG. 6 is a view showing an example of an anomaly detection operation in the anomaly detection device according to the first example embodiment of the present invention.

FIG. 6 shows an example of the flow of an operation of detecting an anomaly by the anomaly detection device 100. Referring to FIG. 6, first, the event signal collection part 131 collects event signals from the agents 108 located in the respective parts of the computer system. Next, the event signal collection part 131 generates a copy for each of the collected event signals, and outputs one of the two identical event signals to the event buffer 122 and outputs the other to the normal-model-based anomaly detection part 132.

The normal-model-based anomaly detection part 132 detects the presence/absence of anomaly in the input event signal based on the normal model 123, and stores the detection result into the normal-model-based anomaly detection result 126, and also outputs the detection result to the rule regulation part 133. The rule regulation part 133, based on the input detection result, sets the validity degree of a rule related to a resource related to the event signal detected as anomalous to value 1, and sets the validity degree of the other rule to value 0.

On the other hand, the rule-based anomaly detection part 134 retrieves the event signal stored in the event buffer 122. The rule-based anomaly detection part 134 also retrieves the validity degrees of the respective rules corresponding to the column of the retrieved event signal in the table of the validity degree 125 shown in FIG. 3. Next, the rule-based anomaly detection part 134 retrieves the rule having the retrieved validity degree of value 1. Next, the rule-based anomaly detection part 134 detects the presence/absence of anomaly of the retrieved event signal based on the retrieved rule, and stores the detection result into the rule-based anomaly detection result 127.

The anomaly detection integration part 135 performs comprehensive determination based on the normal-model-based anomaly detection result 126 and the rule-based anomaly detection result 127, and generates the final anomaly detection result 128. The detection result presenting part 136 displays the final anomaly detection result 128 on the screen display part 113, for example, as shown in FIG. 4, or/and transmits the final anomaly detection result 128 to an external terminal through the communication interface part 111. The anomaly handling part 137 automatically handle the detected anomaly based on the final anomaly detection result 128.

Thus, according to this example embodiment, the following effect can be obtained.

It is possible to, on the same event signal of the computer system, execute the normal-model-based anomaly detection method and thereafter execute the rule-based anomaly detection method. This is because the event signal collection part 131 copies an event signal collected from the computer system, and inputs the event signal into the normal-model-based anomaly detection part 132, and also inputs the event signal into the rule-based anomaly detection part 134 through the event buffer 122.

It is possible to control the validity degree of a rule used by the rule-based anomaly detection part 134 for detecting the presence/absence of anomaly of an event signal, in accordance with the result of anomaly detection on the event signal by the normal-model-based anomaly detection part 132. This is because the rule regulation part 133, based on the result of detection by the normal-model-based anomaly detection part 132, regulate the validity degree of a rule used by the rule-based anomaly detection part 134 for each event signal.

It is possible to present the grounds for reasoning that an event signal detected as anomalous by the normal-model-based anomaly detection part 132 is anomalous, based on a rule of the rule-based anomaly detection part 134. This is because the anomaly detection integration part 135 compares the normal-model-based anomaly detection result 126 with the rule-based anomaly detection result 127, and thereby checks whether or not the event signal detected as anomalous based on normal model is detected as anomalous based on rule, and generates the final anomaly detection result 128 including the event signal detected as anomalous based on normal model and the rule detected as anomalous based on rule.

Even if the rule-based anomaly detection part 134 tends to show false negative, it is possible to suppress false negative in the final anomaly detection result 128. This is because the anomaly detection integration part 135 performs comprehensive determination based on the normal-model-based anomaly detection result 126 and the rule-based anomaly detection result 127, and thereby finally detects as anomalous when it is anomalous by the normal-model-based anomaly detection part 132 regardless of whether or not it is detected as anomalous by the rule-based anomaly detection part 134.

Even if the rule-based anomaly detection part 134 shows a tendency of over-detection, it is possible to prevent the final anomaly detection result 128 from being over-detected due to the influence thereof. The reason is that the anomaly detection integration part 135 performs comprehensive determination based on the normal-model-based anomaly detection result 126 and the rule-based anomaly detection result 127, and thereby finally detects as anomalous if it is detected as anomalous by the normal-model-based anomaly detection part 132 regardless of whether or not it is detected as anomalous by the rule-based anomaly detection part 134. Since the over-detection can be suppressed in this manner, the data amount of the final anomaly detection result 128 is reduced. As a result, the amount of data for transferring the anomaly detection result to the display screen can be reduced, and the display area of the screen to display can be reduced.

Thus, the anomaly detection device 100 according to this example embodiment performs final anomaly detection by executing the normal-model-based anomaly detection method and the rule-based anomaly detection method in parallel and performing comprehensive determination based on the results of anomaly detection by both the methods, and therefore can perform highly accurate detection.

Further, since the validity degree of a rule for detecting the presence/absence of anomaly of an event signal determined to be not anomalous in normal-model-based anomaly detection is set to value 0, rule-based anomaly detection on the event signal determined to be not anomalous in normal-model-based anomaly detection is virtually omitted. Therefore, it is possible to reduce the amount of calculation for anomaly detection.

Second Example Embodiment

Next, an anomaly detection device according to a second example embodiment of the present invention will be described.

The anomaly detection device according to the second example embodiment is different from the anomaly detection device 100 according to the first example embodiment in the following point, and is configured in the same manner, except the following point, as the anomaly detection device 100 according to the first example embodiment.

The event signal collection part 131 is configured to collect event signals of the computer system and output the event signals to the normal-model-based anomaly detection part 132. The event signal collection part 131 is not configured to copy the event signals and output to the event buffer 122.

The normal-model-based anomaly detection part 132 is configured to detect the presence/absence of anomaly in an input event signal, output the detection result to the rule regulation part 133 and also store the detection result into the normal-model-based anomaly detection result 126, and thereafter transmit the event signal after detection of the presence/absence of anomaly to the event buffer 122.

Figure 7:
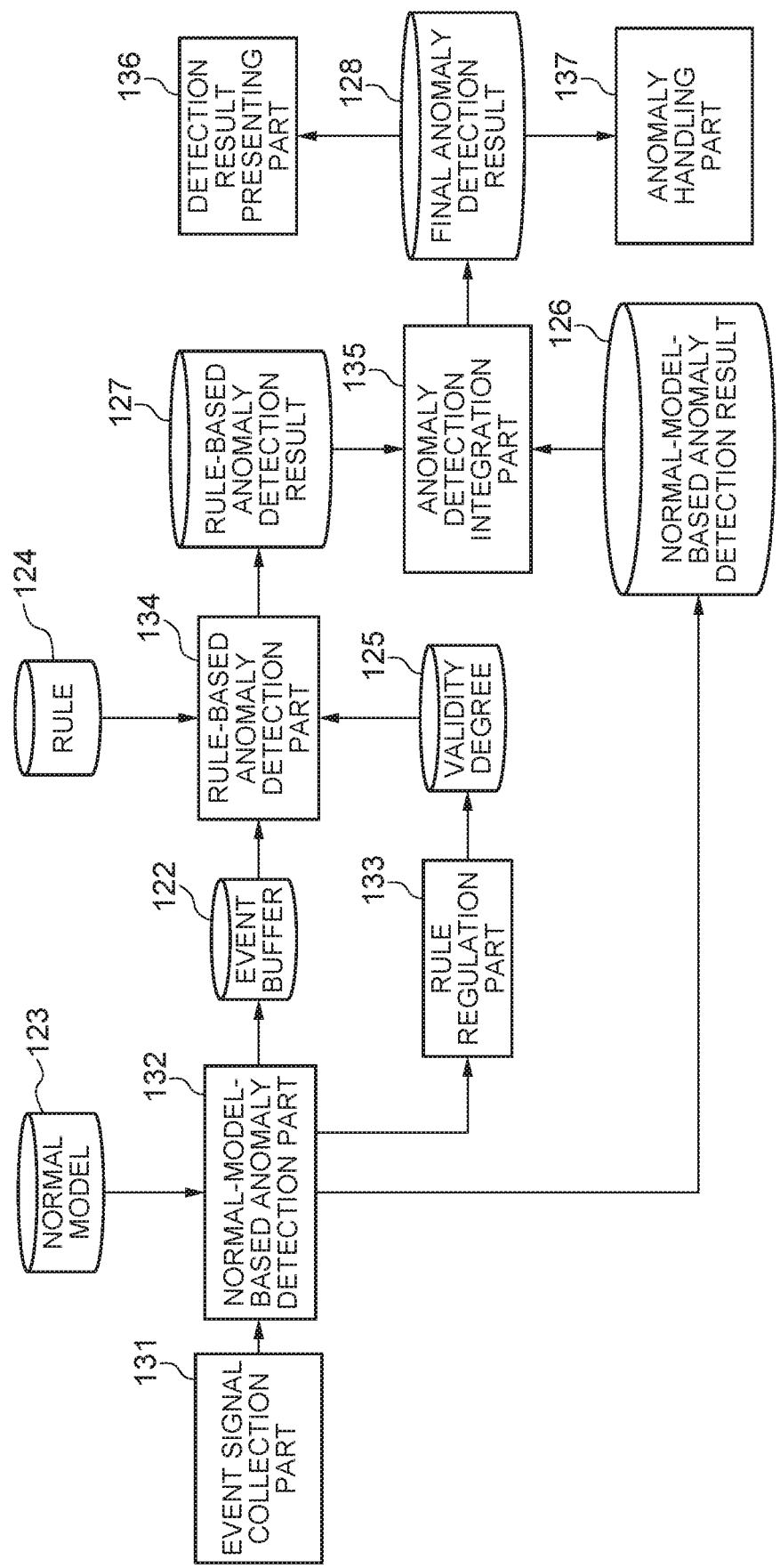
FIG. 7 is a view showing an example of an anomaly detection operation in an anomaly detection device according to a second example embodiment of the present invention.

FIG. 7 shows an example of the flow of an anomaly detection operation in the anomaly detection device 200 according to this example embodiment. Referring to FIG. 7, first, the event signal collection part 131 collects event signals from the agents 108 located in the respective parts of the computer system. Next, the event signal collection part 131 outputs the collected event signals to the normal-model-based anomaly detection part 132.

The normal-model-based anomaly detection part 132 detects the presence/absence of anomaly in input event signals, and stores the detection result into the normal-model-based anomaly detection result 126 and also outputs the detection result to the rule regulation part 133. The normal-model-based anomaly detection part 132 also outputs the event signals after detection of the presence/absence of anomaly to the event buffer 122. The operation thereafter is the same as in the anomaly detection device 100 according to the first example embodiment.

According to this example embodiment, the same effect as in the first example embodiment can be obtained.

Further, according to this example embodiment, it is possible to omit the process of copying an event signal of the computer system by the event signal collection part 131.

Third Example Embodiment

Next, an anomaly detection device according to a third example embodiment of the present invention will be described.

Figure 8:
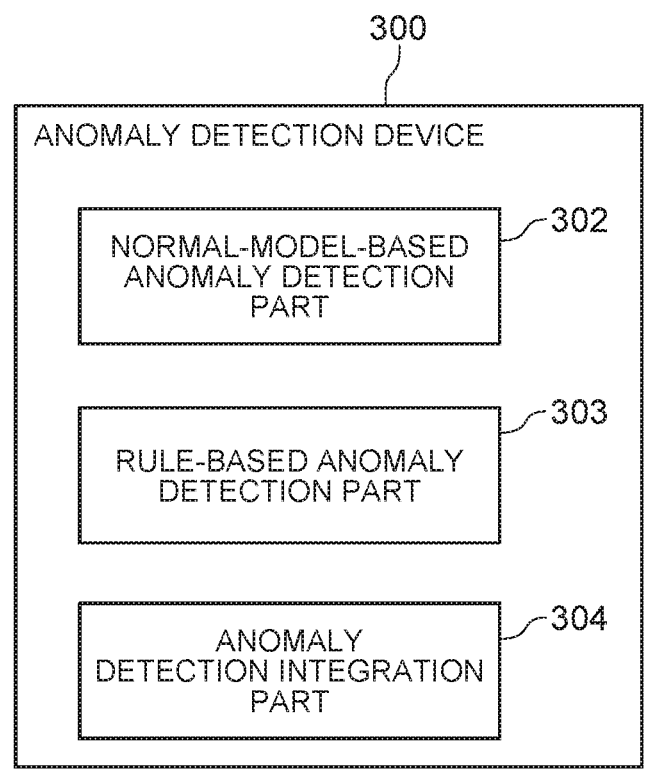
FIG. 8 is a block diagram of an anomaly detection device according to a third example embodiment of the present invention.

Referring to FIG. 8, an anomaly detection device 300 according to the third example embodiment of the present invention includes a normal-model-based anomaly detection part 302, a rule-based anomaly detection part 303, and an anomaly detection integration part 304.

The normal-model-based anomaly detection part 302 is configured to detect the presence/absence of anomaly in an event signal of the computer system based on normal model. The normal-model-based anomaly detection part 302 can be configured in the same manner as the normal-model-based anomaly detection part 132 shown in FIG. 2, but is not limited to that.

The rule-based anomaly detection part 303 is configured to operate in parallel with the normal-model-based anomaly detection part 302 and detect the presence/absence of anomaly in the event signal based on rule. The rule-based anomaly detection part 303 can be configured in the same manner as the rule-based anomaly detection part 134 shown in FIG. 2, but is not limited to that.

The anomaly detection integration part 304 is configured to generate a final anomaly detection result by performing comprehensive determination based on the results of detection by the normal-model-based anomaly detection part 302 and the rule-based anomaly detection part 303. The anomaly detection integration part 304 can be configured in the same manner as the anomaly detection integration part 135 shown in FIG. 2, but is not limited to that.

The anomaly detection device 300 according to this example embodiment configured as described above operates in the following manner. That is to say, the normal-model-based anomaly detection part 302 detects the presence/absence of anomaly in an event signal of the computer system based on normal model. The rule-based anomaly detection part 303 detects the presence/absence of anomaly in the event signal based on rule in parallel with the normal-model-based anomaly detection part 302. Next, the anomaly detection integration part 304 generates a final anomaly detection result by performing comprehensive determination based on the results of detection by the normal-model-based anomaly detection part 302 and the rule-based anomaly detection part 303.

The anomaly detection device 300 according to this example embodiment can increase the accuracy of detection with the configuration and operation as described above. The reason is that the anomaly detection device 300 generates a final anomaly detection result by performing normal-model-based anomaly detection and rule-based anomaly detection in parallel and performing comprehensive determination based on the results of both the detections.

Although the present invention has been described above with reference to the example embodiments, the present invention is not limited to the example embodiments. The configurations and details of the present invention can be changed in various manners that can be understood by one skilled in the art within the scope of the present invention.

For example, as another example embodiment, the anomaly detection integration part 135 may generate the final anomaly detection result 128 in which only an event detected to be anomalous by both the normal-model-based anomaly detection result 126 and the rule-based anomaly detection result 127 is anomalous.

The present invention can be applied to the field of performing anomaly detection, and is favorable specifically in the field of detecting an anomaly in a computer system.

The whole or part of the example embodiments disclosed above can be described as, but not limited to, the following supplementary notes.

(Supplementary Note 1)

An anomaly detection device comprising:
  a normal-model-based anomaly detecting unit configured to detect based on a normal model whether or not an event signal of a computer system is anomalous;
  a rule-based anomaly detecting unit configured to operate in parallel with the normal-model-based anomaly detecting unit, and detect based on a rule whether or not the event signal is anomalous; and
  an anomaly detection integrating unit configured to generate a final anomaly detection result by performing comprehensive determination based on detection results from the normal-model-based anomaly detecting unit and the rule-based anomaly detecting unit.

(Supplementary Note 2)

The anomaly detection device according to Supplementary Note 1, further comprising an event signal collecting unit configured to collect the event signal.

(Supplementary Note 3)

The anomaly detection device according to Supplementary Note 1 or 2, wherein the event signal includes occurrence time of an event relating to an activity of a resource of the computer system and a content of the activity.

(Supplementary Note 4)

The anomaly detection device according to Supplementary Note 3, wherein the rule is concerning the activity of the resource.

(Supplementary Note 5)

The anomaly detection device according to Supplementary Note 4, further comprising a rule regulating unit configured to identify the resource associated with the event signal detected to be anomalous by the normal-model-based anomaly detecting unit, and determine a validity degree of the rule based on whether or not the rule is concerning the identified resource.

(Supplementary Note 6)

The anomaly detection device according to Supplementary Note 5, wherein the rule regulating unit is configured to determine the validity degree for each event signal and for each rule.

(Supplementary Note 7)

The anomaly detection device according to Supplementary Note 6, wherein the rule-based anomaly detecting unit is configured to refer to the validity degree for each rule corresponding to the event signal, use the rule whose validity degree is equal to or more than a threshold value, and detect whether or not the event signal is anomalous.

(Supplementary Note 8)

The anomaly detection device according to any of Supplementary Notes 1 to 7, wherein the event signal that is identical to the event signal input into the normal-model-based anomaly detecting unit is input late into the rule-based anomaly detecting unit.

(Supplementary Note 9)

The anomaly detection device according to any of Supplementary Notes 1 to 8, wherein the event signal collecting unit is configured to copy the event signal, send out one of the two identical event signals to the normal-model-based anomaly detecting unit, and send out the other to an event buffer placed in a stage prior to the normal-model-based anomaly detecting unit.

(Supplementary Note 10)

The anomaly detection device according to any of Supplementary Notes 1 to 8, wherein the normal-model-based anomaly detecting unit is configured to send out the event signal detected whether or not to be anomalous to an event buffer placed in a stage prior to the normal-model-based anomaly detecting unit.

(Supplementary Note 11)

The anomaly detection device according to any of Supplementary Notes 1 to 10, wherein the anomaly detection integrating unit is configured to include the event signal detected to be anomalous by the normal-model-based anomaly detecting unit as an anomalous event signal into the final anomaly detection result.

(Supplementary Note 12)

The anomaly detection device according to any of Supplementary Notes 1 to 10, wherein the anomaly detection integrating unit is configured to include only the event signal detected to be anomalous by both the normal-model-based anomaly detecting unit and the rule-based anomaly detecting unit as an anomalous event signal into the final anomaly detection result.

(Supplementary Note 13)

The anomaly detection device according to any of Supplementary Notes 1 to 12, wherein the anomaly detection integrating unit is configured to perform determination whether or not the event signal detected to be anomalous by the normal-model-based anomaly detecting unit is detected to be anomalous by the rule-based anomalous detecting unit, and include a result of the determination into the final anomaly detection result.

(Supplementary Note 14)

The anomaly detection device according to any of Supplementary Notes 1 to 13, further comprising a detection result presenting unit configured to display the final anomaly detection result on a screen.

(Supplementary Note 15)

The anomaly detection device according to any of Supplementary Notes 1 to 14, further comprising an anomaly handling unit configured to automatically handle a detected anomaly based on the final anomaly detection result.

(Supplementary Note 16)

An anomaly detection method comprising:
  detecting based on a normal model whether or not an event signal of a computer system is anomalous;
  in parallel with the detecting based on the normal model whether or not anomalous, detecting based on a rule whether or not the event signal is anomalous; and
  generating a final anomaly detection result by performing comprehensive determination based on detection results of the detecting based on the normal model whether or not anomalous and the detecting based on the rule whether or not anomalous.

(Supplementary Note 17)

The anomaly detection method according to Supplementary Note 16, further comprising an event signal collecting unit configured to collect the event signal.

(Supplementary Note 18)

The anomaly detection method according to Supplementary Note 16 or 17, wherein the event signal includes occurrence time of an event relating to an activity of a resource of the computer system and a content of the activity.

(Supplementary Note 19)

The anomaly detection method according to Supplementary Note 18, wherein the rule is concerning the activity of the resource.

(Supplementary Note 20)

The anomaly detection method according to Supplementary Note 19, further comprising identifying the resource associated with the event signal detected to be anomalous in the detecting based on the normal model whether or not anomalous, and determining a validity degree of the rule based on whether or not the rule is concerning the identified resource.

(Supplementary Note 21)

The anomaly detection method according to Supplementary Note 20, wherein in the determining the validity degree of the rule, the validity degree is determined for each event signal and for each rule.

(Supplementary Note 22)

The anomaly detection method according to Supplementary Note 21, wherein in the detecting based on the rule whether or not anomalous, the validity degree for each rule corresponding to the event signal is referred to, the rule whose validity degree is equal to or more than a threshold value is used, and it is detected whether or not the event signal is anomalous.

(Supplementary Note 23)

The anomaly detection method according to any of Supplementary Notes 16 to 22, wherein on the event signal detected whether or not to be anomalous based on the normal model, the detecting based on the rule whether or not anomalous is performed thereafter.

(Supplementary Note 24)

The anomaly detection method according to any of Supplementary Notes 16 to 23, wherein in the collecting the event signal, the event signal is copied, one of the two identical event signals is used for the detecting based on the normal model whether or not anomalous, and the other is stored into an event buffer so as to be used late in terms of time for the detecting based on the rule whether or not anomalous.

(Supplementary Note 25)
The anomaly detection method according to any of Supplementary Notes 16 to 23, wherein the event signal detected whether or not anomalous based on the normal model is stored into an event buffer so as to be used thereafter for the detecting based on the rule whether or not anomalous.

(Supplementary Note 26)
The anomaly detection method according to any of Supplementary Notes 16 to 25, wherein in the generating the final anomaly detection result, the event signal detected to be anomalous in the detecting based on the normal model whether or not anomalous is included as an anomalous event signal into the final anomaly detection result.

(Supplementary Note 27)
The anomaly detection method according to any of Supplementary Notes 16 to 25, wherein in the generating the final anomaly detection result, only the event signal detected to be anomalous in both the detecting based on the normal model whether or not anomalous and the detecting based on the rule whether or not anomalous is included as an anomalous event signal into the final anomaly detection result.

(Supplementary Note 28)
The anomaly detection method according to any of Supplementary Notes 16 to 27, wherein in the generating the final anomaly detection result, determination whether or not the event signal detected to be anomalous in the detecting based on the normal model whether or not anomalous is detected to be anomalous in the detecting based on the rule whether or not anomalous is performed, and a result of the determination is included into the final anomaly detection result.

(Supplementary Note 29)
The anomaly detection method according to any of Supplementary Notes 16 to 28, further comprising displaying the final anomaly detection result on a screen.

(Supplementary Note 30)
The anomaly detection method according to any of Supplementary Notes 16 to 29, further comprising automatically handling a detected anomaly based on the final anomaly detection result.

(Supplementary Note 31)
A computer-readable recording medium with a program recorded thereon, the program comprising instructions for causing a computer to functions as:
 a normal-model-based anomaly detecting unit configured to detect based on a normal model whether or not an event signal of a computer system is anomalous;
 a rule-based anomaly detecting unit configured to operate in parallel with the normal-model-based anomaly detecting unit, and detect based on a rule whether or not the event signal is anomalous; and
 an anomaly detection integrating unit configured to generate a final anomaly detection result by performing comprehensive determination based on detection results from the normal-model-based anomaly detecting unit and the rule-based anomaly detecting unit.

DESCRIPTION OF NUMERALS 100 anomaly detection device
101 internet
102 firewall
103 proxy server
104 host computer
105 PC
106 PC
107 SDN
108 agent
111 communication interface part
112 operation input part
113 screen display part
120 storage part
121 program
122 event buffer
123 normal model
124 rule
125 validity degree
126 normal-model-based anomaly detection result
127 rule-based anomaly detection result
128 final anomaly detection result
130 arithmetic processing part
131 event signal collection part
132 normal-model-based anomaly detection part
133 rule regulation part
134 rule-based anomaly detection part
135 anomaly detection integration part
136 detection result presenting part
137 anomaly handling part
200 anomaly detection device
300 anomaly detection device
302 normal-model-based anomaly detection part
303 rule-based anomaly detection part
304 anomaly detection integration part

The invention claimed is:
1. An anomaly detection device comprising:
a memory containing program instructions; and
a processor coupled to the memory, wherein the processor is configured to execute the program instructions to:
generate a normal model by performing machine learning with a time sequence of first event signals as a normal state, the first event signals being collected from a computer system and including occurrence time of an event relating to an activity of a resource of the computer system and a content of the activity;
after generating the normal model, detect, based on the normal model, whether or not a second event signal is anomalous, the second event signal being collected from the computer system and including occurrence time of an event relating to an activity of a resource of the computer system and a content of the activity;
when the second event signal is detected to be anomalous in anomaly detection based on the normal model, identify the resource associated with the second event signal, and determine a validity degree of each of a plurality of preset rules with respect to the second event signal on a basis of whether or not the each rule is associated with the identified resource;
from a plurality of the rules, select one or more rules having the validity degree that is equal to or larger than a threshold with respect to the second event signal and, on a basis of the selected one or more rules, detect whether or not the second event signal is anomalous;
generate a final anomaly detection result related to the second event signal by performing comprehensive determination on a basis of a detection result of the detecting anomaly based on the normal model—and a detection result of the detecting anomaly based on the selected one or more rules; and
automatically handle a detected anomaly based on the final anomaly detection result, wherein handling the detected anomaly includes performing at least one of: disconnecting the computer system from the network, adjusting a firewall setting of the computer system, blocking communication from the computer system; changing a routing table, disconnecting a process in which the detected anomaly is located, blocking communication from a process in which the detected anomaly is located, or forcibly terminating a process in which the detected anomaly is located;

in generating the final anomaly detection result, include, in the final anomaly detection result, only the second event signal detected to be anomalous in the detecting anomaly based on the normal model as an anomalous event signal, and when the second event signal is detected to be anomalous in the detecting anomaly based on the each rule, include, in the anomaly detection result, the each rule based on which the second event signal is detected to be anomalous in association with the second event signal;

in the detecting anomaly based on the normal model, collate the second event signal with the normal model, and generate a normal-model-based detection result including a score whose value becomes larger as a degree of difference from a normal state is higher and the second event signal; and in the determining the validity degree:
when the score is less than a threshold set in advance, set the validity degree with respect to the second event signal of each of the plurality of rules to value 0; and
when the score is equal to or larger than the threshold, set the validity degree with respect to the second event signal of a rule associated with the identified resource, among the plurality of rules, to value 1, and set the validity degree with respect to the second event signal not associated with the identified resource to value 0.

2. The anomaly detection device according to claim 1, wherein the processor is configured to further execute the program instructions to:
in collecting the event signal, copy the event signal, use one of two identical event signals in detecting presence or absence of anomaly based on the normal model, and store another of the two identical event signals into an event buffer so as to be used later in terms of time in detecting presence or absence of anomaly based on the rule.

3. The anomaly detection device according to claim 1, wherein the processor is configured to further execute the program instructions to
store the event signal detected whether or not to be anomalous based on the normal model into an event buffer so as to be used thereafter in detecting presence or absence of anomaly based on the rule.

4. The anomaly detection device according to claim 1, wherein the processor is configured to further execute the program instructions to display the final anomaly detection result on a screen.

5. The anomaly detection device according to claim 1, wherein the processor is configured to execute the program instructions to:
in the detecting anomaly of the second event signal based on the each rule, collate one or more rules, among the plurality of rules, having the validity level of the value 1 or larger with respect to the second event signal, with the second event signal, and generates a rule-based detection result including a final score calculated based on a score previously assigned to one or more rules matching the second event signal, the one or more rules matching the second event signal, and the second event signal.

6. The anomaly detection device according to claim 5, wherein the processor is configured to execute the program instructions to:
in the generating the final anomaly detection result, collate one or a plurality of second event signals included in the normal-model-based detection result with one or a plurality of the second event signals included in the rule-based detection result, classify the second event signals into a first group including one or a plurality of the second event signals included in the normal-model-based detection result and also included in the rule-based detection result, and a second group including one or a plurality of the second event signals included in the normal-model-based detection result but not included in the rule-based detection result, and generate a final anomaly detection result for each group.

7. The anomaly detection device according to claim 1, wherein the processor is configured to further execute the program instructions to, subsequent to automatically handling the detected anomaly, place a program file related to a process in which the detected anomaly is located into quarantine, and copy the quarantined program file to an administration server.

8. An anomaly detection method comprising:
generating a normal model by performing machine learning with a time sequence of first event signals as a normal state, the first event signals being collected from a computer system and including occurrence time of an event relating to an activity of a resource of the computer system and a content of the activity;
after generating the normal model, detecting, based on the normal model, whether or not a second event signal is anomalous, the second event signal being collected from the computer system and including occurrence time of an event relating to an activity of a resource of the computer system and a content of the activity;
when the second event signal is detected to be anomalous in anomaly detection based on the normal model, identifying the resource associated with the second event signal, and determining a validity degree of each of a plurality of preset rules with respect to the second event signal on a basis of whether or not the each rule is associated with the identified resource;
from a plurality of the rules, selecting one or more rules having the validity degree that is equal to or larger than a threshold with respect to the second event signal and, on a basis of the selected one or more rules, detecting whether or not the second event signal is anomalous;
generating a final anomaly detection result related to the second event signal by performing comprehensive determination on a basis of detection results of the detecting anomaly based on the normal model and the detecting anomaly based on the selected one or more rules; and
automatically handling a detected anomaly based on the final anomaly detection result, wherein handling the detected anomaly includes performing at least one of: disconnecting the computer system from the network, adjusting a firewall setting of the computer system, blocking communication from the computer system; changing a routing table, disconnecting a process in which the detected anomaly is located, blocking communication from a process in which the detected anomaly is located, or forcibly terminating a process in which the detected anomaly is located;
in generating the final anomaly detection result, include, in the final anomaly detection result, only the second event signal detected to be anomalous in the detecting anomaly based on the normal model as an anomalous event signal, and when the second event signal is detected to be anomalous in the detecting anomaly based on the each rule, include, in the anomaly detection result, the each rule based on which the second event signal is detected to be anomalous in association with the second event signal;

in the detecting anomaly based on the normal model, collate the second event signal with the normal model, and generate a normal-model-based detection result including a score whose value becomes larger as a degree of difference from a normal state is higher and the second event signal; and in the determining the validity degree:

when the score is less than a threshold set in advance, set the validity degree with respect to the second event signal of each of the plurality of rules to value 0; and when the score is equal to or larger than the threshold, set the validity degree with respect to the second event signal of a rule associated with the identified resource, among the plurality of rules, to value 1, and set the validity degree with respect to the second event signal not associated with the identified resource to value 0.

9. A computer-readable recording medium with a program recorded thereon, the program comprising instructions for causing a computer to execute:

a process to generate a normal model by performing machine learning with a time sequence of first event signals as a normal state, the first event signals being collected from a computer system and including occurrence time of an event relating to an activity of a resource of the computer system and a content of the activity;

after executing the process to generate the normal model, a process to detect, based on the normal model, whether or not a second event signal is anomalous, the second event signal being collected from the computer system and including occurrence time of an event relating to an activity of a resource of the computer system and a content of the activity;

a process to, when the second event signal is detected to be anomalous in anomaly detection based on the normal model, identify the resource associated with the second event signal, and determine a validity degree of each of a plurality of preset rules with respect to the second event signal on a basis of whether or not the each rule is associated with the identified resource;

a process to, from a plurality of the rules, select one or more rules having the validity degree that is equal to or larger than a threshold with respect to the second event signal and, on a basis of the selected one or more rules, detect whether or not the second event signal is anomalous;

a process to generate a final anomaly detection result related to the second event signal by performing comprehensive determination on a basis of detection results of the detecting anomaly based on the normal model and the detecting anomaly based on the selected one or more rules; and a process to automatically handle a detected anomaly based on the final anomaly detection result, wherein handling the detected anomaly includes performing at least one of: disconnecting the computer system from the network, adjusting a firewall setting of the computer system, blocking communication from the computer system; changing a routing table, disconnecting a process in which the detected anomaly is located, blocking communication from a process in which the detected anomaly is located, or forcibly terminating a process in which the detected anomaly is located;

in generating the final anomaly detection result, include, in the final anomaly detection result, only the second event signal detected to be anomalous in the detecting anomaly based on the normal model as an anomalous event signal, and when the second event signal is detected to be anomalous in the detecting anomaly based on the each rule, include, in the anomaly detection result, the each rule based on which the second event signal is detected to be anomalous in association with the second event signal;

in the detecting anomaly based on the normal model, collate the second event signal with the normal model, and generate a normal-model-based detection result including a score whose value becomes larger as a degree of difference from a normal state is higher and the second event signal; and in the determining the validity degree:

when the score is less than a threshold set in advance, set the validity degree with respect to the second event signal of each of the plurality of rules to value 0; and when the score is equal to or larger than the threshold, set the validity degree with respect to the second event signal of a rule associated with the identified resource, among the plurality of rules, to value 1, and set the validity degree with respect to the second event signal not associated with the identified resource to value 0.

* * * * *